April 28, 1925.
T. S. MILLER
1,535,238
THRUST MECHANISM
Filed July 7, 1922
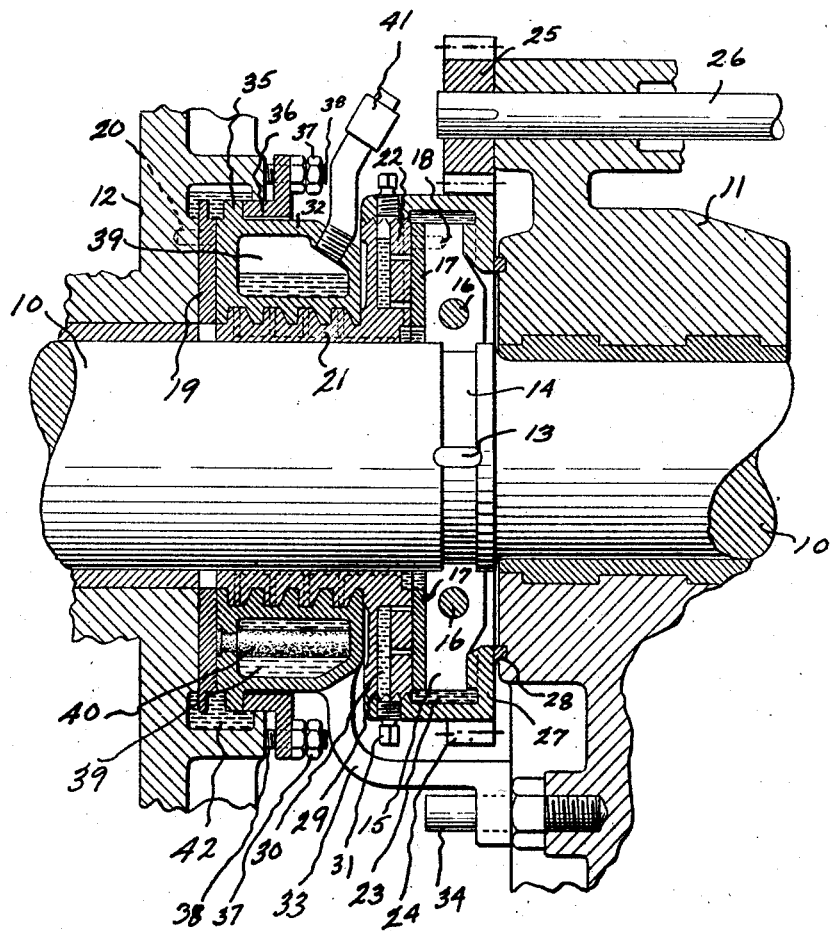
INVENTOR.
Thomas Spencer Miller
BY
Gifford & Bull
ATTORNEYS Patented Apr. 28, 1925.

1,535,238

UNITED STATES PATENT OFFICE.

THOMAS SPENCER MILLER, OF SOUTH ORANGE, NEW JERSEY.

THRUST MECHANISM.

Application filed July 7, 1922. Serial No. 573,499.

*To all whom it may concern:*

Be it known that I, THOMAS SPENCER MILLER, a citizen of the United States, residing at South Orange, in the county of Essex and State of New Jersey, have invented certain new and useful Improvements in Thrust Mechanisms, of which the following is a specification.

My present invention relates to improvements in thrust mechanisms, such as are used for operating clutches or the like, and particularly for operating such clutches in hoisting gear or the like.

My invention will best be understood from the following description and the annexed drawing which shows a section of the parts of a thrust mechanism embodying my invention.

A shaft 10 is rotatably mounted in bearings, one of which is shown at 11. On the shaft 10 and free to rotate thereon is a clutch member 12 arranged to be moved longitudinally of the shaft to bring clutch surfaces into contact with each other or the like, the specific purpose being no part of my present invention. Connected to the shaft by the key 13 and the groove 14 is a thrust-resisting member 15 which may be formed in segments and held together as by bolts 16 in the usual manner. The member 15 may be provided with a thrust ring 17 held thereto by pins 18. Similarly, a thrust ring 19, held by pins 20, may be connected to the face of the hub of the member 12. These thrust rings may be formed of any suitable wear-resisting metal.

Between the rings 17 and 19 is a thrust-producing means which, in the form illustrated, comprises a threaded member 21 not connected to the shaft and having an extension 22 with a face in contact with the thrust face of the ring 17. This extension 22 is carried around the outside of the member 15 to form an oil chamber 23, and also to form the ring of a gear 24, the teeth of which are engaged by a pinion 25 on a shaft 26 extending through a portion of the bearing 11. The wall 27 of the oil chamber 23 is carried upward to complete the chamber and may be sealed as by a ring 28 of felt or other similar material set into the bearing 11.

Preferably, the oil chamber 23 and the ring of the gear 24 are not made integral with the extension 22 of the nut 21, but are threaded thereon, as shown at 29, so as to be relatively adjustable thereto. One or more oil pockets 30 may be formed in the extension 22 with small oil holes communicating with the face of the threaded member 21 in contact with the ring 17. Screw plugs 31 may be used to close these pockets.

The nut 32 on the threaded member 21 has an arm 33 to hold the same from rotation by engagement with a fixed pin 34, the pin 34 and arm 33 being arranged, however, to permit the nut to be moved longitudinally of the pin 34. The nut 32 has a face in contact with the ring 19 and a projection 35 with its right-hand face in contact with a ring 36 held adjustably on the member 12 by the nuts 37 on the studs 38.

The nut 32 may be provided with one or more oil pockets 39 provided with wicking 40 extending through openings for oiling the thrust surfaces inside of the periphery thereof. Lubricant may be supplied to these chambers by oil tubes, such as shown at 41.

An oil chamber 42 formed in the hub of the member 12 surrounds the periphery of the thrust surface between the nut 32 and the member 12, the ring 19 being extended beyond this thrust surface to provide a ring to carry lubricant to the top of the chamber when the shaft 10 is horizontal, as is usually the case. Similarly, the thrust-resisting member 15 dips into the oil in the chamber 23 and carries it to the top, so that it may run through suitable grooves in the thrust faces to lubricate the same.

When a handle or any other means for partially rotating the shaft 26 is turned, this rotates the pinion 25 and turns the gear 24 and with it the threaded member 21. Since motion of this threaded member to the right of the figure is resisted by the thrust-resisting member 15, the rotation of the member 21 will move the nut 32 to the left of the figure and thus move the member 12 in the same direction. Similarly, when the shaft 26 is turned in the opposite direction to move the member 21 in the opposite direction from that just described, the nut 32 will be drawn to the right of the figure, and through the ring 36, will draw the member 12 also to the right. When the threaded member 21 is to be turned in a direction to draw the member 12 to the right of the figure, it is obvious that this would set up a tendency to move the threaded member to the left of the figure, and to prevent this, I provide a contacting surface on the wall 27 which, in turn, contacts with a surface on the right-hand side of the member 15. By this contact, the threaded member 21 is held against motion to the left of the figure. By having the threaded connection 29 between the ring forming the chamber 23 and carrying the wall 27 and the projection 22 of the threaded member 21, the wear of the parts may be compensated for. Similarly, by providing the loose ring 36 held by the nuts and studs 37 and 38, changes in relation between the nut 32 and the member 12 may be compensated for, the nuts 37 being screwed up as the thrust surfaces wear down.

By the arrangement described, a thrust-producing means which is exceedingly compact and readily accessible from the outside is provided, since obviously it is unnecessary to have levers or the like extending between the bearing 11 and the member 12. Obviously, the shaft 26 may be extended to any desired point for operation.

It will be understood that the arrangement which I have described is merely illustrative and that the embodiments of my invention may be widely varied.

No claims are made herein to the novel lubricating devices which I have illustrated, such devices being claimed in my copending application Serial No. 573,501.

I claim:

1. In a device of the class described, a shaft, a bearing for the shaft, a clutch member on said shaft and arranged to be moved longitudinally thereof, a thrust-resisting member, a thrust-producing means between the clutch member and the thrust-resisting member, comprising a threaded member on the shaft and unconnected thereto and having a face contacting with a face of said thrust-resisting member, a nut on said threaded member and held against rotation and free to move longitudinally of the shaft, said nut contacting with said clutch member, and means to rotate said threaded member to move said clutch member away from the thrust-resisting member, adjustable means connecting said nut to said clutch member to draw the latter toward the thrust-resisting means when the threaded member is rotated to move the nut toward said thrust-resisting means.

2. In a device of the class described, a shaft, a bearing for the shaft, a clutch member on said shaft and arranged to be moved longitudinally thereof, a thrust-resisting member secured to said shaft, a thrust-producing means between the clutch member and the thrust-resisting member, comprising a threaded member on the shaft and unconnected thereto and having a face contacting with a face of said thrust-resisting member and being provided with a portion engaging said thrust resisting member on the opposite side thereof, a nut on said threaded member and having an arm extending toward said bearing, a pin on said bearing engaging said arm arranged to prevent rotation of the nut and to permit motion of the nut longitudinally of the shaft, and means to rotate said threaded member to move said clutch member away from the thrust-resisting member.

3. In a device of the class described, a shaft, a bearing for the shaft, a clutch member on said shaft and arranged to be moved longitudinally thereof, a thrust-resisting member secured to said shaft, a thrust-producing means between the clutch member and the thrust-resisting member, comprising a threaded member on the shaft and unconnected thereto and having a face contacting with a face of said thrust-resisting member, a nut on said threaded member and held against rotation and free to move longitudinally of the shaft, said nut contacting with said clutch member, and means to rotate said threaded member to move said clutch member away from the thust-resisting member, said nut being connected to said clutch member to draw the latter toward the thrust-resisting means when the threaded member is rotated to move the nut toward said thrust-resisting means, and said threaded member having an extension engaging said thrust-resisting member on the side opposite said threaded member to prevent motion of said threaded member away from said thrust-resisting member.

4. In a device of the class described, a shaft, a bearing for the shaft, a clutch member on said shaft and arranged to be moved longitudinally thereof, a thrust-resisting member secured to said shaft, a thrust-producing means between the clutch member and the thrust-resisting member, comprising a threaded member on the shaft and unconnected thereto and having a face contacting with a face of said thrust-resisting member, a nut on said threaded member and held against rotation and free to move longitudinally of the shaft, said nut contacting with said clutch member, and means to rotate said threaded member to move said clutch member away from the thrust-resisting member, said nut being connected to said clutch member to permit relative rotation and to prevent relative longitudinal motion therebetween, and said threaded member being connected to said thrust-resisting member to permit relative rotation and to prevent relative longitudinal motion therebetween.

5. In a device of the class described, a shaft, a bearing for the shaft, a clutch member on said shaft and arranged to be moved longitudinally thereof, a thrust-resisting member, a thrust-producing means between the clutch member and the thrust-resisting member, comprising a threaded member on the shaft and unconnected thereto and having a face contacting with a face of said thrust-resisting member, a nut on said threaded member and held against rotation and free to move longitudinally of the shaft, said nut contacting with said clutch member, means to rotate said threaded member to move said clutch member away from the thrust-resisting member, said nut being connected to said clutch member to permit relative rotation and to prevent relative longitudinal motion therebetween, and said threaded member being connected to said thrust-resisting member to permit relative rotation and to prevent relative longitudinal motion therebetween, and means to adjust said connections to take up wear.

6. In a device of the class described, a shaft, a bearing for the shaft, a clutch member on said shaft and arranged to be moved longitudinally thereof, a thrust-resisting member secured to said shaft, a thrust-producing means between the clutch member and the thrust-resisting member, comprising two interengaging threaded members surrounding said shaft, one of said members having a face contacting with a face of said thrust-resisting member and being provided with a portion engaging said thrust-resisting member on the opposite side thereof, the other threaded member having an arm extending toward said bearing, a pin on said bearing engaging said arm arranged to prevent rotation of said second threaded member and to permit motion thereof longitudinally of the shaft, and means to rotate said first threaded member.

7. In a device of the class described, a shaft, a bearing for the shaft, a clutch member on said shaft and arranged to be moved longitudinally thereof, a thrust-resisting member secured to said shaft, a thrust-producing means between the clutch member and the thrust-resisting member, comprising two interengaging threaded members surrounding said shaft, one of said members having a face contacting with a face of said thrust-resisting member and being provided with a portion engaging said thrust-resisting member on the opposite side thereof, the other threaded member having an arm extending toward said bearing, a pin on said bearing engaging said arm arranged to prevent rotation of said second threaded member and to permit motion thereof longitudinally of the shaft, means to rotate said first threaded member, and a connection between the first said threaded member and said clutch member whereby movement of said first threaded member longitudinally of the shaft in either direction positively moves said clutch member in a corresponding direction.

THOMAS SPENCER MILLER.